United States Patent [19]

Mills

[11] Patent Number: 5,236,220
[45] Date of Patent: Aug. 17, 1993

[54] STOWABLE TELESCOPING SEAT BELT MECHANISM

[75] Inventor: Roy L. Mills, Macomb Twp., Mt. Clemens County, Mich.

[73] Assignee: Allied Signal Inc., Morristown, N.J.

[21] Appl. No.: 876,654

[22] Filed: Apr. 30, 1992

[51] Int. Cl.⁵ .............................................. B60R 22/22
[52] U.S. Cl. ................................ 280/801 R; 297/481
[58] Field of Search ............... 280/808, 801; 297/481, 297/483, 468; 296/68.1

[56] References Cited

U.S. PATENT DOCUMENTS

| 4,445,722 | 5/1984 | Schaper | 297/216 |
| 4,465,302 | 8/1984 | Miki et al. | 280/808 |

FOREIGN PATENT DOCUMENTS

| 2931552 | 2/1981 | Fed. Rep. of Germany | 280/808 |
| 3837170 | 5/1990 | Fed. Rep. of Germany | 296/68.1 |
| 2575708 | 7/1986 | France | 248/307 |

Primary Examiner—Karin L. Tyson
Attorney, Agent, or Firm—Markell Seitzman

[57] ABSTRACT

A telescoping seat belt device comprising: a support (42,142); and a buckle plate (70) for supporting a seat belt buckle; and a pivoting and sliding mechanism (50, 90; 150, 190) for telescopically moving the buckle plate and a buckle from an extended position to a stowed position. The mechanism includes an activation bar (50) rotationally mounted on the support (42) and a slide link (60) pivotally supported at one end on the first pivot (52); a second link (90) rotatably secured to the second pivot (94), wherein the buckle plate is slidable on the slide link (60) from a first position to a second position, and wherein the second link (90) is connected to the buckle plate (70) such that the buckle plate moves on the slide link (60) in response to the movement of the second link. A first spring (58) joins the activator bar and the second link coupling the motion of the activator bar (50) to the second link such that in response to the movement of the activator bar the first spring urges the second link to rotate towards the first pivot such motion causing the buckle plate (70) to slide toward the second position along the slide link, wherein as the buckle plate moves toward the second position the slide link is caused to rotate toward the second pivot carrying the buckle plate with it and moving the buckle to the stowed position.

9 Claims, 4 Drawing Sheets

STOWABLE TELESCOPING SEAT BELT MECHANISM

BACKGROUND AND SUMMARY OF THE INVENTION

The present invention relates to a telescoping mechanism thst permits the seat belt buckle to be stored below floor level and when in normal operation raises the seat belt buckle to a sufficient height to permit a vehicle occupant to easily insert an associated tongue within the buckle.

Reference is made to FIGS. 1 and 2 which illustrate the prior art seat belt mechanism. FIG. 1 illustrates a rear seating configuration for a vehicle with the seat cushion 20 and seat back 22 shown in phantom line. A seat belt buckle of known variety is secured to a link 26 pivoted about point 27. A torsion spring is also provided at location 27. In order to obtain a greater amount of storage room at the rear of a vehicle, the cushion 20 and seat back 22 can be moved forwardly (see FIG. 2) by known mechanisms which are not part of the present invention. Thereafter, a flap 28 is rotated in the direction of arrow 29, such rotation engages the seat belt buckle and link 26 and rotates both downwardly such that they can be stored within a compartment 30 below the level of the floor 23 in the rear portion of the vehicle. When the flap 28 is rotated from its position shown in FIG. 2 to its position shown in FIG. 1, the spring associated with the link 26 and pivot 27 urges the buckle upwardly. One deficiency of this arrangement is that the size of the compartment 30 restricts the overall length of the link and buckle such that, when in normal operation, the buckle barely reaches the top part of the cushion. This type of configuration makes it rather cumbersome for the vehicle user to secure the tongue portion of the seat belt to the buckle.

Accordingly, the invention comprises: a telescoping seat belt device comprising: a support; and a buckle plate for supporting a seat belt buckle; and a pivoting and sliding mechanism for telescopically moving the buckle plate and a buckle from an extended position to a stowed position. The mechanism includes an activation bar rotationally mounted on the support and a slide link pivotally supported at one end on the first pivot; a second link rotatably secured to the second pivot, wherein the buckle plate is slidable on the slide link from a first position to a second position, and wherein the second link is connected to the buckle plate such that the buckle plate moves on the slide link in response to the movement of the second link. A first spring joins the activator bar and the second link coupling the motion of the activator bar to the second link such that in response to the movement of the activator bar the first spring urges the second link to rotate towards the first pivot such motion causing the buckle plate to slide toward the second position along the slide link, wherein as the buckle plate moves toward the second position the slide link is caused to rotate toward the second pivot carrying the buckle plate with it and moving the buckle to the stowed position. A second and more compact telescoping mechanism is also disclosed.

It is an object of the present invention to provide a seat belt mechanism that improves upon the deficiencies of the prior art. A further object of the present invention is to provide a telescoping seat belt mechanism and one which may be stored within a compartment, such compartment typically being below the level of floor of a vehicle.

Many other objects and purposes of the invention will be clear from the following detailed description of the drawings.

DETAILED DESCRIPTION OF THE INVENTION

Figure 3:
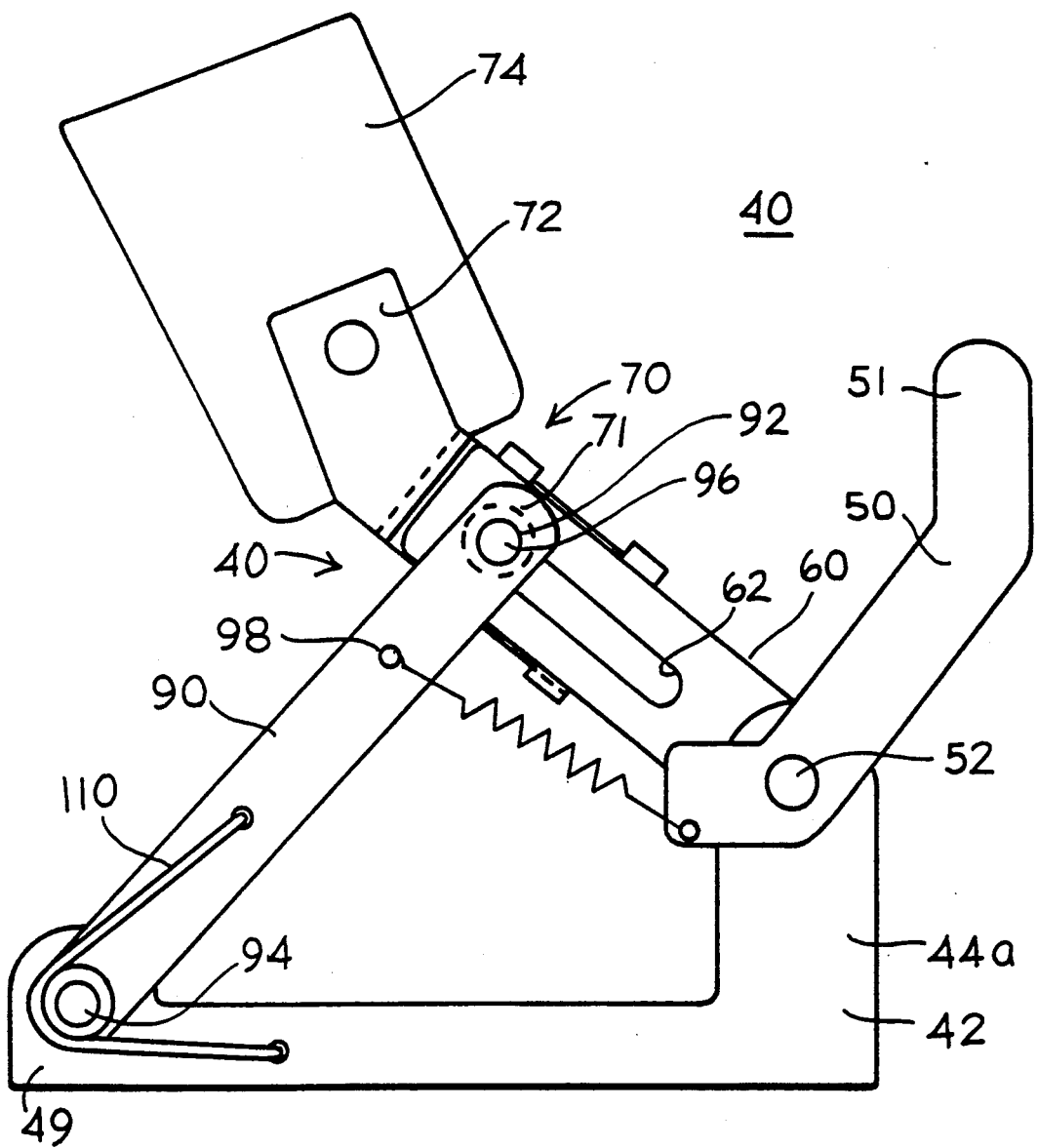
FIG. 3 illustrates a side plan view of the first embodiment of the present invention.
Figure 4:
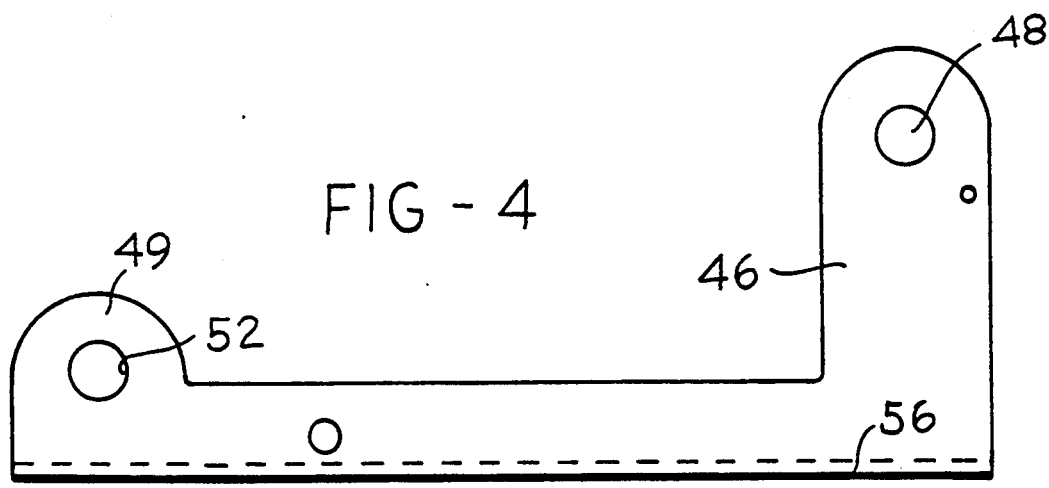
FIGS. 4 and 5 illustrate isolated views of a frame.
Figure 5:
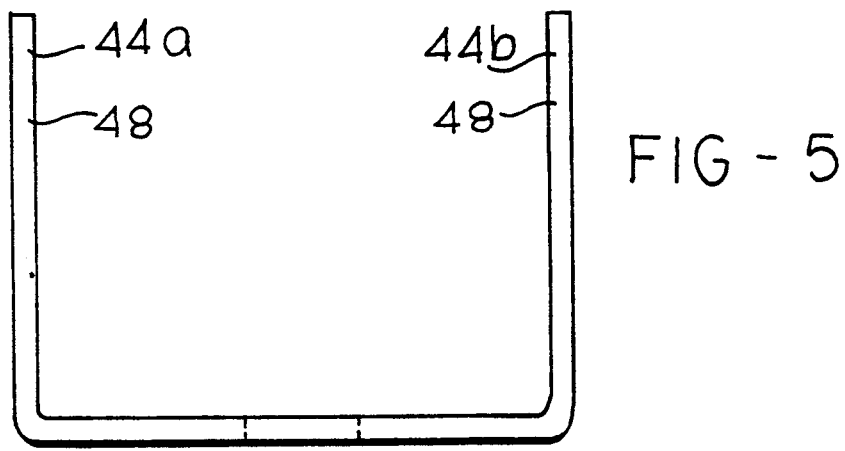

Reference is made to FIGS. 3, 4 and 5. FIG. 3 illustrates a side plan view of a seat belt mechanism. The mechanism comprises a support frame or bracket 42. In the embodiment of the invention shown the frame is generally of U-shaped configuration, having a bottom and two side 44a and b. Only side 44a is shown on FIG. 3. Each side 44a and 44b respectively includes an extending leg such as 46. Leg 46 includes an opening which provides a pivot or bearing surface 48 (see FIG. 4). Frame 42 further includes a smaller extending leg 49 having a similar opening to provide a pivot or bearing surface. FIG. 5 illustrates an end view of the frame 42. As will be seen from the description below, a telescoping mechanism can be secured to each of the side portions 44a and 44b with the frame 42 inserted between two adjacent seating positions. The following description will describe only one of the seat belt mechanism as the other is identical.

Figure 1:
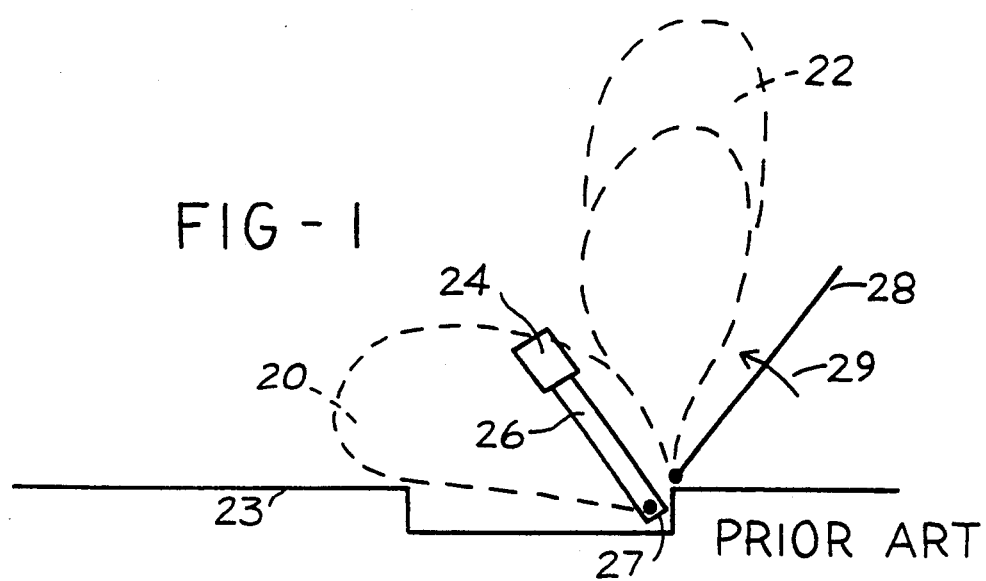
FIGS. 1 and 2 illustrate a prior art seat belt mechanism.
Figure 6:
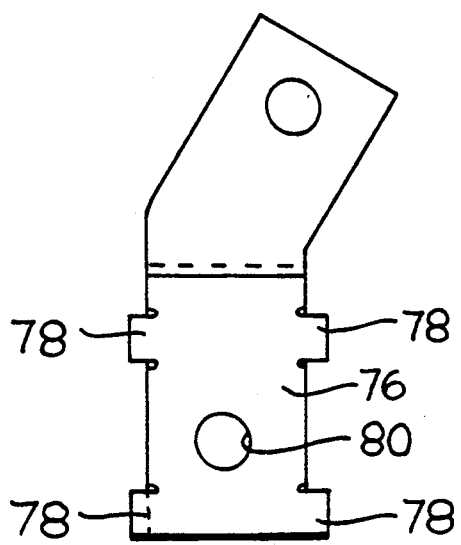
FIGS. 6 and 7 illustrate various views of a buckle plate.
Figure 7:
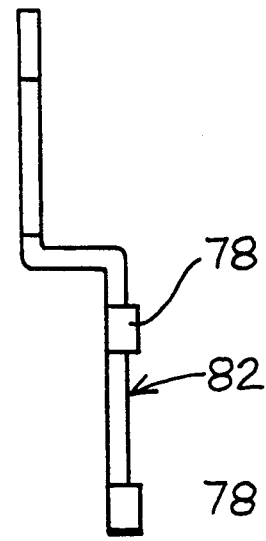

Returning to FIG. 3, an activator bar 50 is rotatably secured such as through a pivot link 52 to the frame 42. The bar 50 includes a top portion 54 that is adapted to be moved either manually or by the flap 28 (shown in FIG. 1). The other end of the activation bar 50 includes an opening 56 for receipt of a tension spring 58. Also, typically mounted to the frame 42 is a slider link which has a circular opening (not visible) through which the pivot 52 is received and an oblong opening 62. Slidably secured about the sides of the slider link is a buckle plate 70 which is also shown in FIGS. 6 and 7. One end 72 of the buckle plate is adapted to be fastened to a conventional seat belt buckle generally shown as 74 in a known manner.

The buckle plate 70 may be of flat construction or bent as illustrated in FIGS. 6 and 7. A first portion such as 76 of the plate 70 is provided with downwardly extending side portions 78 which may be fabricated as a single projection on either side of the plate 70, or as illustrated, as a plurality of such projections. The plate 76 also includes a fastener opening 80. Upon assembly the underside 82 of the plate 70 slides upon the slider link 60 with the members 78 engaging the sides of the slider link 60. As can be appreciated, the members 78 prevent the buckle plate from rotating relative to the slider link 60. A second link 90 comprising a generally oblong member having openings 92 and 94 at respective ends thereof is secured at one side to the arm 49 of the frame 42 and to the other side to the buckle plate 70 by a pin or shaft 96. The pin or shaft 96 is received through opening 80. Teflon washers 71 may be placed at any location which exhibits a metal to metal contact to minimize friction. As can also be seen, the other end of the tension spring 58 is secured within an opening 98 of the link 90. A torsion spring 110 is secured to the frame 42 and link 90 to bias the link 90 in a counter-clockwise direction as viewed in FIG. 3.

Figure 2:
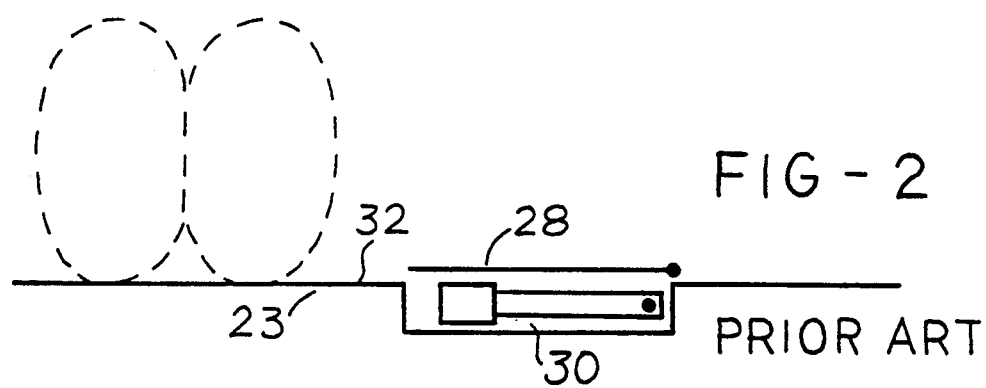
Figure 8:
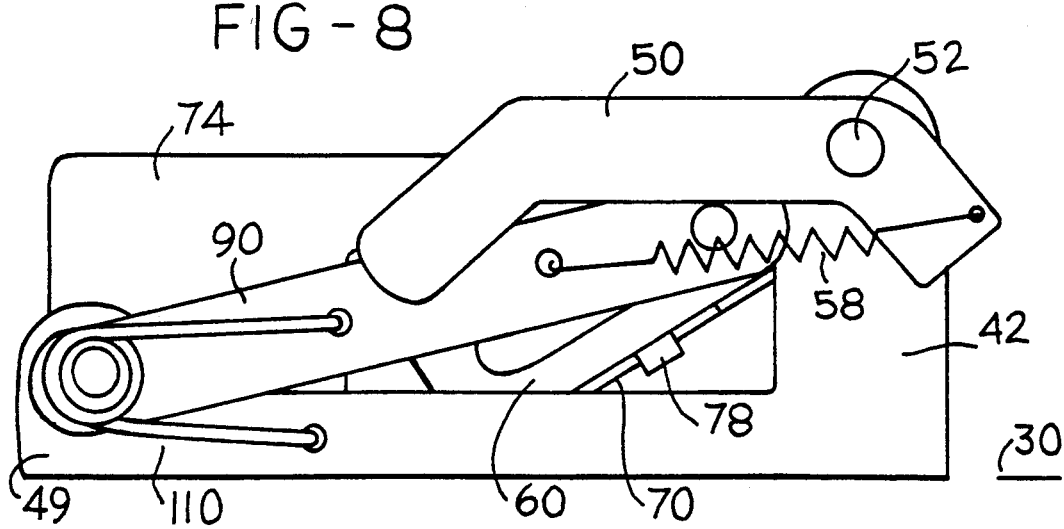
FIG. 8 illustrates the mechanism of FIG. 1 in its stowed position.

The seat belt mechanism 40 operates as follows. With reference to FIG. 3, the seat belt buckle 74 is illustrated in its extended position. In this configuration the torsion spring 110 biases link 90 counter-clockwise in a manner so that the torsion force causes the buckle plate which is attached to link 90 to slide upwardly within the opening 62. After the vehicle operator moves the seats to their stowed configuration similar to that illustrated in FIG. 2, the pivoting flap 28 engages end 54 of the activator bar 50 (or if the flap is not used the bar is moved manually) thereby rotating same in a counter-clockwise direction. The movement of the lower end of the actuator bar extends spring 58 which in turn draws the link 90 downwardly. As the link 90 moves within slot 62 it carries with it the buckle plate thereby moving the buckle plate down the slider link 60 toward the pivot 52. Simultaneously, the slider link 60 is also rotated counter-clockwise or downwardly carrying the buckle 74 with it. When the activator bar is fully rotated, i.e., approximately 90 degrees from the orientation shown in FIG. 3, the buckle 74 is positioned substantially at the bottom of the frame 42 providing for a compact folded configuration as shown in FIG. 8. When the flap 28 is opened, the torsion spring 110 urges the link 90 outwardly causing the buckle plate and slider to move to the configurations illustrated in FIG. 3. As the link 90 moves outwardly, the activator bar is caused to rotate to its normal position due the spring force generated by the torsion spring 110.

Figure 9:
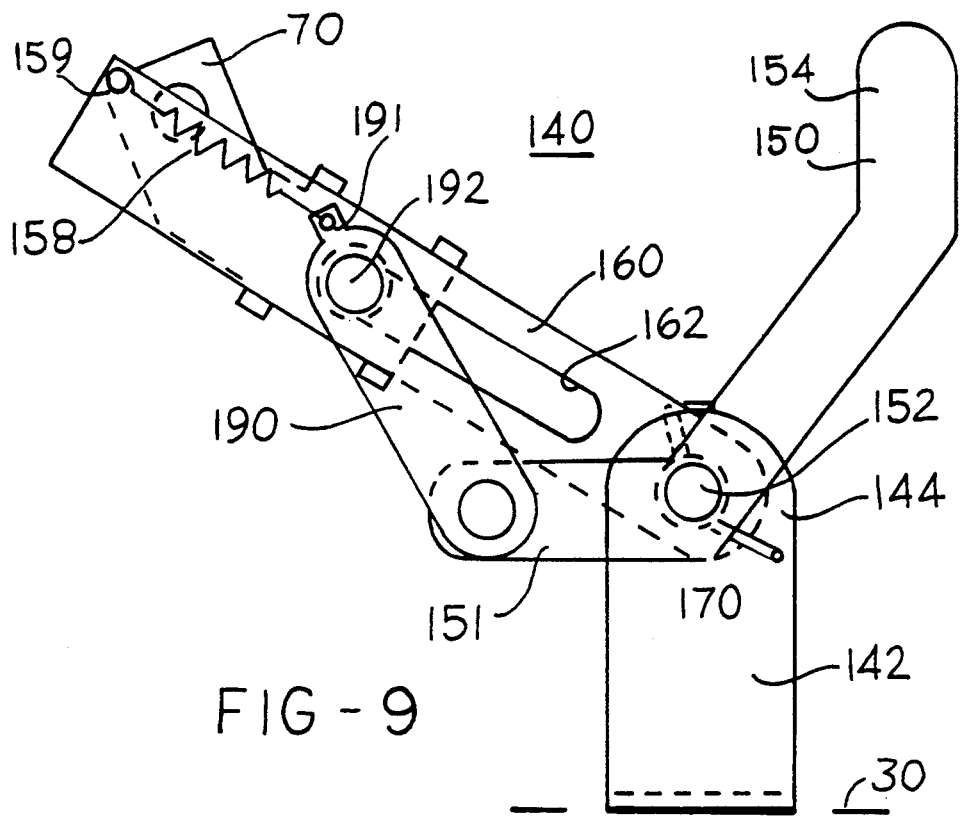
FIG. 9 illustrates an alternate embodiment of the invention.
Figure 10:
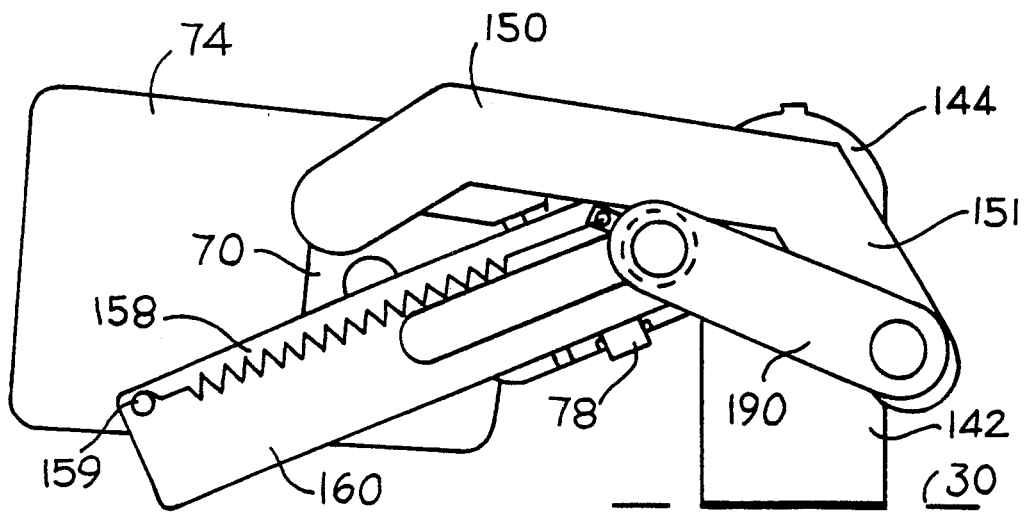
FIG. 10 illustrates the mechanism of FIG. 9 in its stowed condition.

Reference is now made to FIG. 9 which illustrates a second embodiment of the invention. As illustrated in FIG. 8, the mechanism 140 comprises an activator bar 150 similar in shape to bar 50 of FIG. 3. The activator bar 150 includes an extending leg 151. The bar 150 is rotationally mounted upon a frame 142 which comprises a single extending leg 144. The frame 142 can be U-shaped and include a second leg in which case it would support two mechanisms 140. Also pivoted to the frame 142 is a slide link 160 which includes a central opening 162. Slidably mounted to the slider link 160 is the buckle plate 70 of identical construction to the buckle plate illustrated in FIG. 3. A second link 190 joins the end 151 of the actuator bar 150 to the buckle plate utilizing appropriate pins, shafts or rivets to provide for rotational displacement and bushings or washers to reduce friction. One end 191 of link 190 is adapted to receive a tension spring 158 which is secured to an end of the slider link 160. As illustrated therein, the other end of the spring 158 is secured about a pin 159. A torsion spring 170 is provided about the pivot 152 which biases the actuator bar 150 in a clockwise manner. The operation of this alternate embodiment is as follows. As the flap 28 engages an end 154 of the actuator bar, the actuator bar 150 is rotated counter-clockwise, thereby causing the pin or rivet 192 to move downwardly in slot or opening 162. As the link 190 and pin 192 move, the buckle plate and seat belt buckle 74 attached thereto is moved downwardly and also rotated counter-clockwise as the slider link will generally follow the downward motion of the end 151 of the actuator bar and link 190. As the actuator bar 150 is rotated approximately 90 degrees, the end 154 will impact an extending portion of the pin 192 thereby pushing the slide link and buckle downwardly to its stowed position. Upon opening the flap 28, the torsion spring restores the mechanism 140 to the configuration shown in FIG. 9. The stowed position of mechanism 140 is shown in FIG. 10.

Many changes and modifications in the above described embodiment of the invention can, of course, be carried out without departing from the scope thereof. Accordingly, that scope is intended to be limited only by the scope of the appended claims.

I claim:

1. A seat belt mechanism (40, 140) comprising:
   a support (42, 142);
   first means (70) for supporting a seat belt buckle (74);
   second means (50, 90; 150, 190) for telescopically moving the first means and the buckle from an extended position to a stowed position;
   the second means includes an activator bar (50) rotationally mounted on the support (42), the motion of the actuator bar initiating movement of the first means;
   wherein the support (42) comprises a frame including first and second pivots (52; 94), the activator bar pivotally supported on the first pivot (52) and wherein
   the second means further comprises
   a slide link (60) pivotally supported at one end on the first pivot (52); a second link (90) rotatably secured to the second pivot (94), wherein the first means comprises a buckle plate (70) slidable on the slide link (60) from a first position to a second position, and wherein the second link (90) is connected to the buckle plate (70) such that the buckle plate moves on the slide link (60) in response to the movement of the second link;
   a first spring (58) joins the activator bar and the second link coupling the motion of the activator bar (50) to the second link such that in response to the movement of the activator bar the first spring urges the second link to rotate towards the first pivot such motion causing the buckle plate (70) to slide toward the second position along the slide link, wherein as the buckle plate moves toward the second position the slide link is caused to rotate toward the second pivot carrying the buckle plate with it and moving the buckle to the stowed position.

2. The mechanism as defined in claim 1 wherein the slide link (60) includes an elongated slot (82) and wherein the second link (90) is joined to the buckle plate through by a pin (92) extending through the slot.

3. The mechanism as defined in claim 2 wherein the buckle plate (70) includes means (78) for preventing rotation relative to the slide link.

4. The mechanism as defined in claim 3 further including a second spring (110) interconnecting the support (44) and the second link (90) for biasing the second link in a direction to urge the buckle plate towards the first position.

5. A seat belt mechanism (40, 140) comprising:
   a support (42, 142);
   first means for supporting a seat belt buckle (74);

second means for telescopically moving the first means and the buckle from an extended position to a stowed position;

the second means including an activator bar (50) rotationally mounted on the support (42), the motion of the activator bar initiating movement of the first means;

wherein the support (142) includes a first pivot (152), the activator bar (150) being pivotally supported on the first pivot (152);

the second means further comprising:

a slide link (160) pivotally supported relative to the first pivot;

a second slide link (190) rotationally supported at a first end thereof on the activator bar (150);

the first means comprising a buckle plate (70) slidingly supported on the slide link (160) and movable thereon from a first position to a second position; wherein a second end of the second link (190) is connected to the buckle plate (70); such that the motion of the second end moves the buckle plate.

6. The mechanism as defined in claim 5 wherein a spring (158) biases the second link outwardly along the slide link.

7. The mechanism as defined in claim 6 wherein
the slide link (160) includes an elongated slot (162) and wherein
the second link is joined to the buckle plate by a pin (192) extending through the slot.

8. The mechanism as defined in claim 7 wherein the rotational motion of the activator bar (150) causes the second end of the second link (190) to move in the slot carrying with it the buckle plate and moving the buckle plate from the first position toward the second position, wherein continued rotation of the activator bar causes same to engage the pin (192) such that further rotation of the activator bar causes the slide link to rotate about the first pivot, and moves the slide link, buckle plate and a buckle (74) attached thereto to the stowed position.

9. The mechanism as defined in claim 8 further including a torsion spring (170) between the support and the slider link (160) for counter-rotating the slider link bar thereby moving the buckle from its stowed position to the extended position.

* * * * *